Patented Jan. 8, 1952

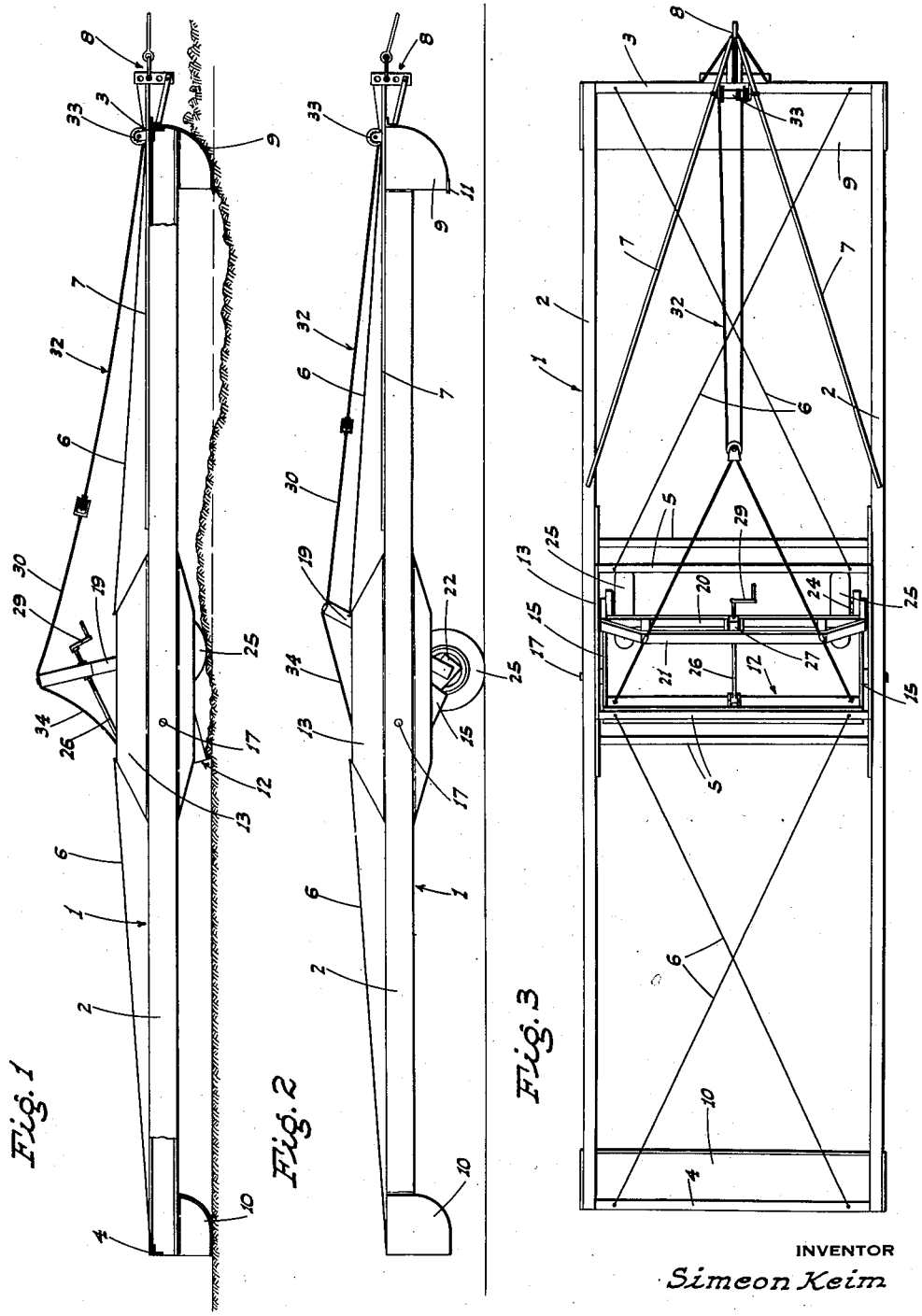

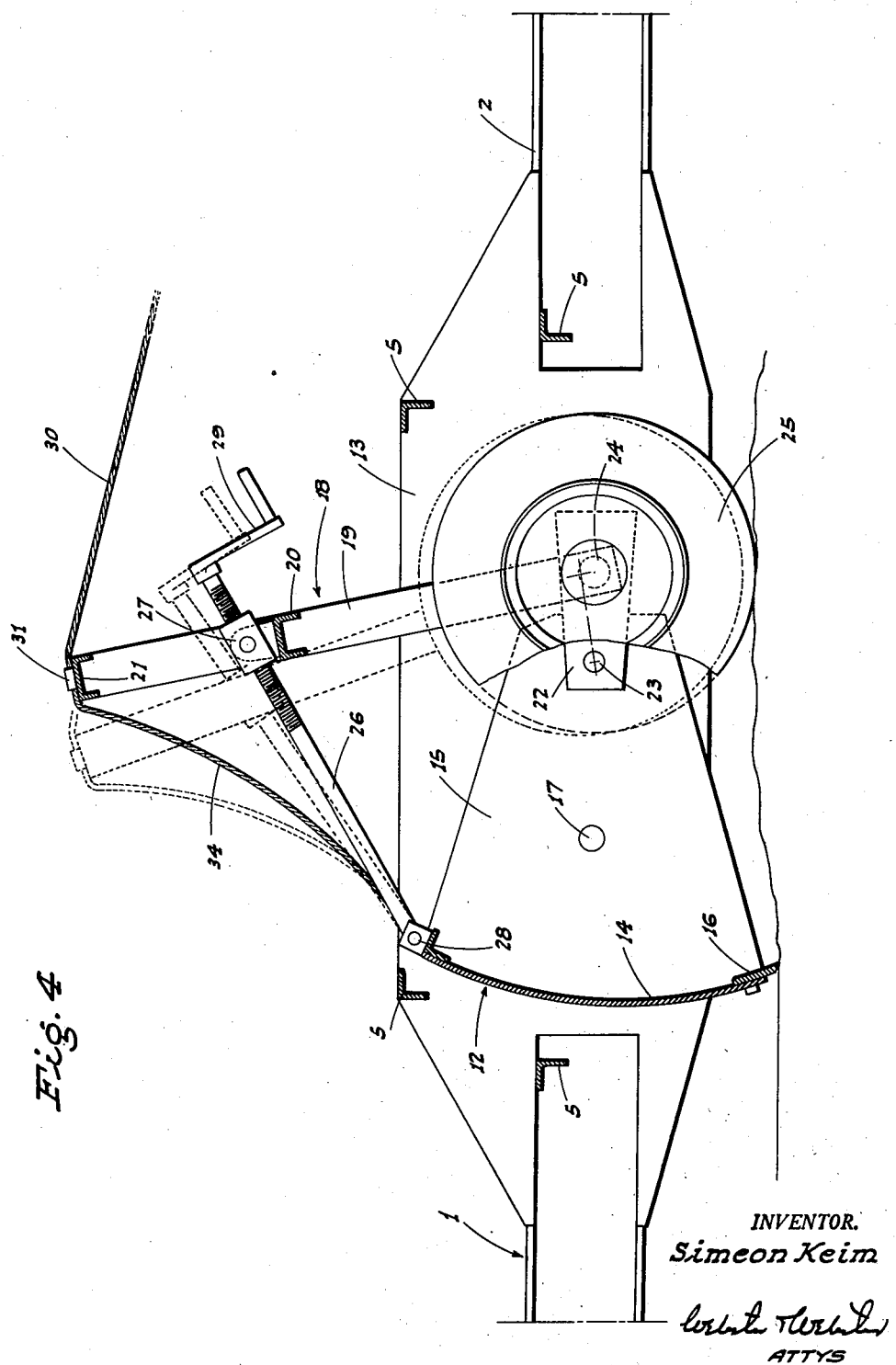

2,581,672

UNITED STATES PATENT OFFICE 2,581,672

LAND LEVELER

Simeon Keim, Galt, Calif., assignor to Preco Incorporated, Los Angeles, Calif., a corporation of California Application May 17, 1948, Serial No. 27,410

5 Claims. (Cl. 37—150)

This invention relates to, and it is an object to provide, an improved land leveler of the type known as a finish leveler and which is adapted for use to work seed beds or the like to a very smooth surface.

Another object of the invention is to provide a land leveler, as above, which comprises, in novel combination, an elongated frame having ground engaging floats at opposite ends, and a vertically adjustable, wheel controlled scraper unit mounted on the frame intermediate said ends.

An additional object of the invention is to provide a land leveler, as in the preceding paragraph, in which the scraper unit is constructed in a manner so that, with advance of the implement, the wheels which said unit includes act to automatically raise or lower the scraper to maintain the same in a substantially constant leveling position.

It is also an object to provide the implement with an effective arrangement for pre-selecting or adjusting the working level of the scraper.

Another object of the invention is to provide for relative vertical adjustment of the wheels whereby to raise the whole implement for road transport, from place to place, with adequate ground clearance.

Further objects are to provide a land leveler which is simple to operate; to provide a land leveler having high maneuverability; and to provide a land leveler which is simple in structure with few moving parts.

A further object of the invention is to provide a rugged, practical, and reliable land leveler, and yet one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the implement in working position.

Fig. 2 is a similar view, but shows the implement in transport position.

Fig. 3 is a plan view of the implement.

Fig. 4 is an enlarged fragmentary sectional elevation of the wheel controlled scraper unit.

Referring now more particularly to the characters of reference on the drawings, the implement comprises an elongated main frame, indicated generally at 1, which main frame includes longitudinal side beams 2, a front cross beam 3, and a rear cross beam 4. Intermediate its ends, and in longitudinally spaced apart relation, the frame includes upper and lower cross bars 5; there being diagonal, and crossing brace rods 6 connected between front cross beam 3 and the corresponding uppermost cross bar 5, and between the rear cross beam 4 and the corresponding uppermost cross beam 5. Additionally, the main frame includes, at the forward portion thereof, forwardly converging braces 7, and at the front end said frame is fitted with a hitch 8 adapted for connection to a tractor in draft relation.

The main frame 1 is fitted, at opposite ends, with a transversely extending front float 9 and a transversely extending rear float 10; said floats having downwardly and rearwardly curved leading working faces, and being fitted, at the bottom rear edge, with replaceable shoes 11.

Substantially centrally of its ends, and between the front and rear ones of the cross bars 5, the implement includes a vertically adjustable, wheel controlled scraper unit, indicated generally at 12, which is constructed as follows:

The side beams 2 are fitted with upstanding side plates 13 of substantially vertical width in relation to said side beams, extending both above and below the latter. A tranverse drag scraper 14, including forwardly projecting side wings 15 at its ends, is disposed between the side plates 13; the drag scraper including a replaceable blade 16 at its lower edge. Transverse pivots 17 connect the side wings 15, intermediate their ends, to corresponding side plates 13, whereby the scraper 14 is vertically adjustable about the pivots 17 as an axis.

Ahead of the side wings 15 there is an upstanding transversely extending, longitudinally swingable mounting frame, indicated at 18; such frame including upstanding end legs 19 coupled together above their lower end portions by an intermediate cross bar 20 and a top cross bar 21. At their lower ends the legs 19 include fixed, rearwardly projecting brackets 22 transversely pivoted, as at 23, to the side wings 15 a considerable distance ahead of the pivots 17.

Spindles 24 project laterally inwardly from the lower ends of the legs 19 and are fitted with pneumatic tire wheels 25.

A screw 26 is threaded through a pivotally mounted nut 27 on the intermediate cross bar 20 centrally of its ends; the screw 26 thence extending at a downward and rearward incline to rotative and pivotal connection, as at 28, with the scraper 14 at its upper edge. The upper and forward end of the screw 26 is fitted with a hand crank 29.

A pair of pull cables 30 are connected, at transversely spaced points, to the top cross bar 21 by clamps 31, and thence extend forwardly in converging relation. At their forward ends the converging pull cables 30 are connected to a longitudinal block and tackle system 32 which leads to connection with a hand winch 33 mounted centrally on the front cross beam 3. The cables 30 extend rearwardly beyond the clamps 31 as normally slack cables 34 which lead downwardly to connection with the upper edge of the scraper 14 adjacent opposite ends thereof.

When the above described land leveler is in use, as in Fig. 1, it is pulled by the tractor along the ground, after adjustment of the working position of the scraper 14 by manipulation of the screw 26 by the crank 29. As is evident, such adjustment of the screw 26 alters the relative vertical adjustment of the blade 16 relative to the bottoms of the wheels 25.

As the implement advances along the ground, the front float 9 acts as a clod breaker; the rounded working face of such float preventing pile-up of earth ahead thereof. The rear float 10 smooths the leveled ground to a flat finish after passage of the scraper unit 12. As the implement advances the scraper unit 12, through the medium of the drag scraper 14, acts to level the ground over which the implement is passing. The scraper 14 is maintained at a substantially constant level by the wheels 25; lowering of said wheels as they enter a depression relatively raising the scraper 14, while raising of said wheels as they traverse a rise relatively lowers the scraper 14 to accomplish the desired result.

It is thus possible with the described arrangement to accomplish very accurate finish leveling with the implement.

When the implement is thus in use, both the pull cables 30 and cables 34 are slack so as not to interfere with the automatic vertical control or adjustment of the scraper 14 by the wheels 25; i. e. without restricting pivotal rocking motion of the scraper unit about the pivots 17 as an axis.

When it is desired to transport the implement from place to place the screw 26 is adjusted to extend it until the cables 34 are relatively taut. Thereafter, the winch 33 is operated to shorten the block and tackle system 32 which, working through the pull cables 30, swings the frame 18 forwardly, causing lowering of the wheels 25 to the transport position of Fig. 2, and at which time the scraper 14 is raised relatively high above the ground.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A finish leveler comprising an elongated main frame adapted to be connected to a tractor in draft relation, a transverse, upstanding mounting frame disposed in the main frame intermediate its ends and in longitudinally swingable relation, transversely spaced ground wheels on the lower part of the mounting frame, a transverse scraper to the rear of the wheels, side wings projecting forward from opposite ends of the scraper, transverse pivots between the side wings and mounting frame, a normally fixed length connection between the mounting frame above said pivots and the upper part of the scraper, and other transverse pivots, to the rear of said first named pivots, connecting the side wings intermediate their ends to the main frame; the first named transverse pivots being disposed between the wheel axis and said other transverse pivots.

2. A finish leveler comprising an elongated main frame adapted to be connected to a tractor in draft relation, a transverse, upstanding mounting frame disposed in the main frame intermediate its ends and in longitudinally swingable relation, transversely spaced ground wheels on the lower part of the mounting frame, a transverse scraper to the rear of the wheels, side wings projecting forward from opposite ends of the scraper, transverse pivots between the side wings and mounting frame, a connection between the mounting frame above said pivots and the upper part of the scraper, and other transverse pivots, to the rear of said first named pivots, connecting the side wings intermediate their ends to the main frame; and a normally slack pull cable system between the upper part of the mounting frame and the main frame ahead thereof.

3. A finish leveler comprising an elongated main frame adapted to be connected to a tractor in draft relation, a transverse, upstanding mounting frame disposed in the main frame intermediate its ends and in longitudinally swingable relation, transversely spaced ground wheels on the lower part of the mounting frame, a transverse scraper to the rear of the wheels, side wings projecting forward from opposite ends of the scraper, transverse pivots between the side wings and mounting frame, a longitudinal adjustable member connected between the mounting frame above said pivots and the upper part of the scraper, and other transverse pivots, to the rear of said first named pivots, connecting the side wings intermediate their ends to the main frame; there being normally slack cables leading from the upper part of the mounting frame downwardly and rearwardly to the scraper and downwardly and forwardly to the main frame, respectively, and power means to pull on the cable leading to the main frame.

4. A land leveler comprising an elongated substantially rectangular main frame runner supported at each end, a scraper blade disposed transversely between the sides of the frame at a point substantially midway between the ends of such frame, forwardly projecting side wings on the ends of the blade, means pivoting the side wings intermediate their ends to the sides of the main frame, a substantially vertically disposed swing frame disposed ahead of the forward ends of the side wings, wheels journaled on the lower ends of the swing frame, rearwardly projecting brackets on the lower ends of the swing frame, the rear ends of the brackets being pivoted to the forward ends of the side wings, and an adjustment member connected between the upper edge of the blade and a point on the swing frame intermediate its ends.

5. A leveler as in claim 1, with means to pull forwardly on the mounting frame from above the wheels and transverse pivots whereby to effect a lifting of the main frame relative to the wheels.

SIMEON KEIM.

REFERENCES CITED

The following references are of record in the file of this patent:

UNITED STATES PATENTS

| Number | Name | Date |
| --- | --- | --- |
| 1,388,809 | Edginton | Aug. 23, 1921 |
| 1,691,854 | Overman | Nov. 13, 1928 |
| 1,765,910 | Eversman | June 24, 1930 |
| 2,113,660 | LeTourneau | Apr. 12, 1938 |
| 2,283,744 | Lethlean | May 19, 1942 |